United States Patent [19]

Gupta et al.

[11] Patent Number: 4,945,001
[45] Date of Patent: Jul. 31, 1990

[54] INTERNAL STABILIZATION OF POLYCARBONATE RESINS

[75] Inventors: Amitava Gupta, Pasadena; Ranty H. Liang, Arcadia; Andre H. Yavrouian, La Crescenta, all of Calif.

[73] Assignee: California Institute of Technology, Pasadena, Calif.

[21] Appl. No.: 200,246

[22] Filed: May 31, 1988

Related U.S. Application Data

[60] Division of Ser. No. 939,523, Dec. 8, 1986, Pat. No. 4,749,726, which is a continuation-in-part of Ser. No. 410,397, Aug. 23, 1982, abandoned.

[51] Int. Cl.[5] .......................... C08J 3/28; C08G 61/12; C08G 63/46
[52] U.S. Cl. .................................. 428/412; 528/125; 528/196; 528/204; 525/439
[58] Field of Search ............................ 522/4; 428/412

[56] References Cited

PUBLICATIONS

Gupta et al., "Macromolecules", vol. 13, No. 2, Mar.-Apr. 1980, Amer. Chem. Soc., pp. 262–267.

Primary Examiner—John C. Bleutge
Assistant Examiner—Arthur H. Koeckert
Attorney, Agent, or Firm—Marvin E. Jacobs

[57] ABSTRACT

A new polycarbonate copolymer resin is formed by internal generation of stabilizers bound to the polymer chain. Irradiation of a solid piece or a deoxygenated solution of the resin at a first frequency below 300 nm generates 2 to 8 mol percent of phenyl salicylate groups which are rearranged to dihydroxybenzophenone groups by irradiating the resin under oxygen excluding conditions at a second frequency from 300 to 320 nm.

3 Claims, 3 Drawing Sheets

INTERNAL STABILIZATION OF POLYCARBONATE RESINS

CROSS-REFERENCE TO RELATED APPLICATION

This is a division of application Ser. No. 939,523, filed Dec. 8, 1986, now U.S. Pat. No. 4,749,726, which is a continuation-in-part of Ser. No. 410,397, filed Aug. 23, 1982, now abandoned.

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates to the stabilization of polycarbonate resins and more particularly to the stabilization of such resins by intrinsic generation of stabilizing moieties by irradiation of the resin.

BACKGROUND REFERENCES

1. A. Gupta, R. Liang, J. Moacanin, R. Goldbeck and D. Kliger, Macromolecules, 13, 262 (1980).
2. D. Billies, P. Hrdlovic, and F. Manasek, Polym. Latt., 4, 1, (1966).
3. A. Gupta, A. Rembaum and J. Moacanin, Macromolecules, 11, 1285 (1978).
4. A. Factor and M. L. Chu, Polym. Degradation and Stability, 2, 203, (1980).
5. D. T. Clark and H. S. Munro, Polymer Degradation and Stability, 4, 441, (1982).

BACKGROUND ART

Polycarbonate resins exhibit several useful properties. Low water absorption and high heat distortion temperature minimize dimensional changes. Low water absorption also provides improved chemical, electrical and mechanical stability. Polycarbonate resins also have excellent thermal stability, good electrical properties and high impact strength.

Polycarbonates also are optically clear. The combination of toughness and optical characteristics make polycarbonates the material of choice for uses such as encapsulating photovoltaic solar cells, window glazing and street lighting covers. The toughness, high strength and resistance to shattering makes polycarbonates superior to acrylate for glazing aircraft windows. However, polycarbonates are very sensitive to exposure to ultraviolet radiation and discolor to an unattractive yellow condition on exposure to ultraviolet radiation. Outdoor exposure of polycarbonate panels to solar radiation leads to yellowing of the panels, often within a few days.

Several known organic ultraviolet stabilizers or absorbers have been added to polycarbonate resin molding or casting formulations. However, these low molecular weight additives migrate to the surface and/or are rapidly leached out of the panel or coating and are lost under weather conditions involving high temperature, high humidity and high radiation exposure levels. Discoloration occurs within a few weeks to a few months after placing structures or panels in outdoor service even if they contain high levels of ultraviolet stabilizers.

Phenyl saicyate (PS), a commercially used UV stabilizer, has been found to be generated within polycarbonate (PC) polymers. Phenyl salicylate groups provide an important contribution to stabilization of the polymer by quenching of singlet oxygen species[1]. Ninety-nine percent stabilization is achieved by adding $10^{-2}$ M of phenyl salicylate to the polymer system[1].

Photochemical conversion of carbonate groups in polycarbonate of bisphenol A (PC) to phenyl salicylate is well known and has been shown to occur via Photo-Fries Rearrangement. This photoconversion has been studied in vacuum[1,2] and in air, and occurs only when short wavelength UV ($\gamma < 300$ nm) is incident on the polymer. Long wavelength UV ($\gamma > 300$ nm) has little or no effect on PC in vacuum but does cause extensive photodegradation via a complicated series of photooxidation reactions in presence of oxygen or air [2-4].

The phenyl salicylate (PS) groups are photolabile and a small amount (less than $10^{-4}$ mol %) of the PS groups were converted to 2,2'-dihydroxybenzophenone (DHB) groups at the short wavelength radiation ($\gamma < 300$ nm). The PS groups may also react with oxygen in the presence of UV. Therefore, polycarbonate containing PS groups is not acceptable for long term ambient use since the PS groups will be lost on exposure to light and oxygen. A more photoinert product is required.

DHB is a more acceptable photoinert UV absorber. However, the small amount produced at the short wavelength is not capable of stabilizing and protecting the resin. The resin must contain at least 0.01 wt. % conversion (PC to DBP) corresponding to a DBP concentration of $10^3$ mol/l preferably a conversion of 0.1 wt. % and a DBP concentration of about $10^{-2}$ moles/l.

Not only is the photoconversion to DBP low at the lower frequency, but the PC also absorbs UV at this frequency leading to chain scission and degradation of the PC resin.

Gupta et al[1] do not disclose the desirability of substantially converting all the PS to DBP nor do they disclose the procedure to be utilized. Furthermore, the need to exclude air or oxygen was not disclosed in this reference. Indeed, the photochemistry in presence of oxygen was not elucidated until after the experiments in Reference were conducted. The publications of Clark[5] and Factor[4], showed that PhotoFries Rearrangement did not occur in PC in presence of oxygen.

DISCLOSURE OF THE INVENTION

It has now been discovered in accordance with this invention that polycarbonates can be stabilized by internal generation of an effective amount of dibenzophenone stabilizer bound to the polymer backbone and that these stabilizer-modified materials effectively stop environmental photodegradation. The stabilization system of the invention is applicable to all polycarbonate formulations and fabricated products whether in film, sheet, rod, fiber, powder or molded form.

The wavelength needed for this complete conversion must be longer than 300 nm, otherwise the competitive formation of phenyl salicylate continues as the residual carbonate groups absorb light strongly at wavelengths longer than 290 nm. The PS groups do not receive any significant amount of radiation in this region. Since phenyl salicylate does not absorb wavelengths longer than 350 nm, the wavelength window needed for the second stage is $300 < \gamma < 350$ nm, preferably 313 nm, in order to form a sufficient amount of the benzophenone derivative to stabilize the polymer to outdoor solar radiation.

The polycarbonate resin can be stabilized in solution or in the form of a solid article. A polycarbonate article is treated by irradiating the article at a first frequency below 300 nm, suitably from 240 to 280 nm, which promotes internal generation of phenyl salicylate radicals. The article is then irradiated in absence of oxygen at a second frequency from 300 nm to 320 nm, typically about 313 nm, which induces rearrangement of the phenyl salicylate to dihydroxybenzophenone. Due to reflection, absorption and refraction, the radiation only penetrates into a surface layer. Only the surface layer contains polycarbonate resin molecules modified to contain the dihydroxybenzophenone structure.

This procedure is advantageous for treating preformed articles of complex shape and has the additional advantage of not modifying the bulk of the article to preserve the original mechanical properties of the polycarbonate. The rate and yield are much faster when the polycarbonate resin is irradiated in solution, especially stirred solution. In stirred solution, the resin molecules are more readily exposed to the irradiation beam and the resin is homogeneously converted to contain an even distribution of the stabilized resin molecules.

The stabilizer-modified polycarbonate is prepared in solution in accordance with the present invention by dissolving polycarbonate resin in a solvent that does not absorb wavelengths longer than 240 nm such as a chlorinated hydrocarbon, suitably methylene chloride. The solution is deoxygenated and irradiated under oxygen excluding conditions at a first frequency below 300 nm, suitably from 240 to 280 nm which promotes internal generation of phenyl salicylate. The solution is then irradiated in absence of oxygen at a second frequency from 300 nm to 320 nm, typically 313 nm, which induces rearrangement of the phenyl salicylate to dihydroxybenzophenone. At this critical frequency the radiation is absorbed by the phenyl salicylate but not by the carbonate groups in the polymer. Some chain scission may occur. Absence of oxygen avoids formation of quinones. The modified polymer is recovered by evaporation of the solvent or by precipitation.

In a series of outdoor weathering tests, several modified and unmodified polycarbonate samples were examined for photodegradation. The samples modified according to the invention remained clear while the unmodified samples yellowed. The testing was repeated with various high intensity light sources. Only the polycarbonates, modified to contain radiation-induced, bound stabilizers as per the present process, did not photodegrade.

These and many other feature and attendant advantages of the invention will become better understood by reference to the following detailed description when considered in conjunction with the accompanying drawings:

DETAILED DESCRIPTION OF THE INVENTION

Figure 1:
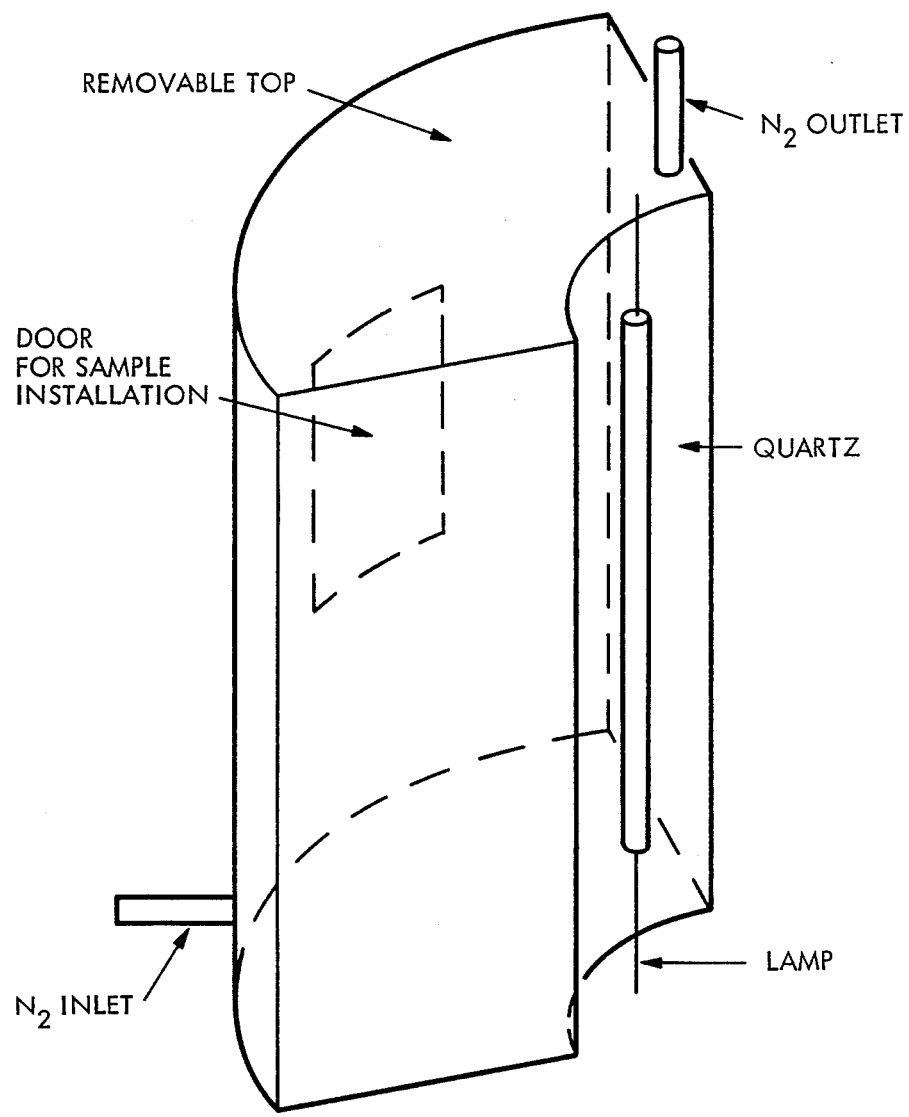
FIG. 1 is a schematic drawing of a photochemical reactor for photoconversion of solid articles.

The invention relates to stabilization of any polycarbonate, but is particularly useful with the polycarbonates containing diarylene alkanes such as those of the formula:

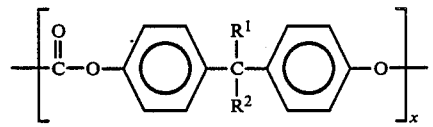

where $R^1$ and $R^2$ are selected from H, aryl, preferably monocyclic hydrocarbon such as phenyl or lower alkyl of 1 to 6 carbon atoms. When $R^1$ and $R^2$ are both methyl, the diaryl alkyl group can be provided by bisphenyl-A as a starting material. X is an integer such that the molecular weight is above 100,000. Polycarbonates can be formed by reaction of a diol such as a bis-phenol with phosgene or by ester exchange by reacting a bisphenol with a diaryl carbonate.

In the first step of irradiation according to this invention, some of the diaryl carbonate structures of the polymer chain are rearranged in deoxygenated solution to phenyl salicylate groups to form a copolymer:

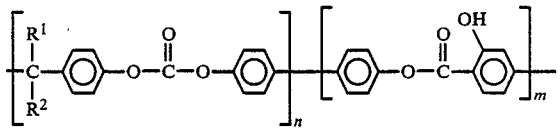

where the ratio of n/m is from 12/1 to 15/1.

Further irradiation at the higher wavelength of 300 to 320 nm results in chain scission and further rearrangement to form copolymers containing the following structure:

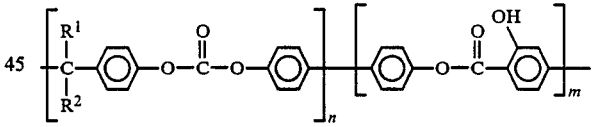

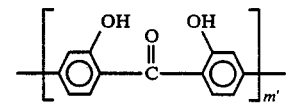

The solution is deoxygenated under vacuum or by bubbling an inert gas such as nitrogen through the solution. The solution is maintained under oxygen excluding conditions during reaction since presence of oxygen would interfere with the desired rearrangement. During the first step, the irradiation is applied at an intensity and for a duration sufficient to convert, at least 0.5 mol percent, preferably from 2 to 8 mol percent of the diaryl carbonate to phenyl salicylate groups. The second irradiation is conducted until at least 50 percent and preferably substantially all the phenyl salicylate groups are converted to the 2,2'-dihydroxy-benzophenone groups. Irradiation in the presence of a broad band source such as sunlight in the presence of oxygen results in a degraded product containing quinones.

EXAMPLE 1

About 5 grams of Lexan, a polycarbonate of bisphenol-A were dissolved in 250 ml of methylene chloride and deoxygenated by bubbling high purity nitrogen gas through the solution. The solution was placed in a quartz tube or other reactor, and irradiated with a low pressure mercury arc lamp as the source of 253.7 nm radiation. Irradiation was continued until about 3 to 5 mole percent of the polycarbonate groups were converted to phenyl salicylate.

The formation of phenyl salicylate was monitored by measurement of the absorbance at 320 nm. An 0.1 increase in absorbance in a 1 cm pathlength cell is equivalent to about $2.4 \times 10^{-4}$ moles of phenyl salicylate. An absorbance of 1.6 units is required for a 5 percent conversion.

Because the quantum yield of formation of phenyl salicylate is 0.15, total radiation dosage of $4 \times 10^{18}$ photons is required for the above process. Since each photon carries approximately 4 eV of energy, about 2 joules of energy is sufficient to effect the conversion. A 10 watt lamp operating at 5 percent efficiency will put out this energy in about 4 seconds if all the radiant energy is absorbed by the polymer solution.

The second photochemical irradiation step was carried out by further irradiating the solution with 300 to 320 nm radiation, typically 313 nm, from a medium pressure mercury arc lamp source. At this critical frequency the radiation was absorbed by the phenyl salicylate groups but not by the carbonate groups on the polymer and chain scission does not occur. The conversion of phenyl salicylate to 2,2'-dihydroxybenzophenone was monitored by measuring absorbance at 355 nm. An 0.1 unit absorbance increase at 355 nm is equivalent to $1.2 \times 10^{-4}$ moles per liter of 2,2'-dihydroxybenzophenone. A suitable source is a 450 watt Hanovia lamp equipped with a potassium dichromate/sodium bicarbonate solution, for example, as described by J. G. Calvert and J. N. Pitts, Jr., in "Photochemistry," Wiley, New York, 1966.

Careful analysis of aliquots of product at various reaction stages indicated that all of the phenyl salicylate formed in the first step was converted to benzophenone derivative in the second step. Assuming a quantum yield of conversion of 0.2, approximately 1.5 joules light energy was required for complete conversion.

Following this UV processing, the polymer was recovered by removing the solvent, or by precipitation. The solid was dried and processed in the usual manner for glazing or other outdoor applications. In a series of control outdoor weathering tests, many treated and untreated samples were examined for yellowing. Only the treated samples remained clear. These tests were repeated with various intense light sources. Again, it was noted that the untreated controls showed yellowing, while all the treated samples remained clear.

EXAMPLE 2

Solid films of polycarbonate were photoconverted to DBP derivative in the reactor 10 shown in FIG. 1. The reactor 10 is in the form of a segment of a cylindrical toroid having a curved outer wall spaced from an inner UV transparent quartz curved inner wall. The outer wall has a door for sample installation and a UV lamp is mounted on the outside of the inner wall. The top of the reactor is removable. A gas inlet and gas outlet are connected to the reactor.

Figure 2:
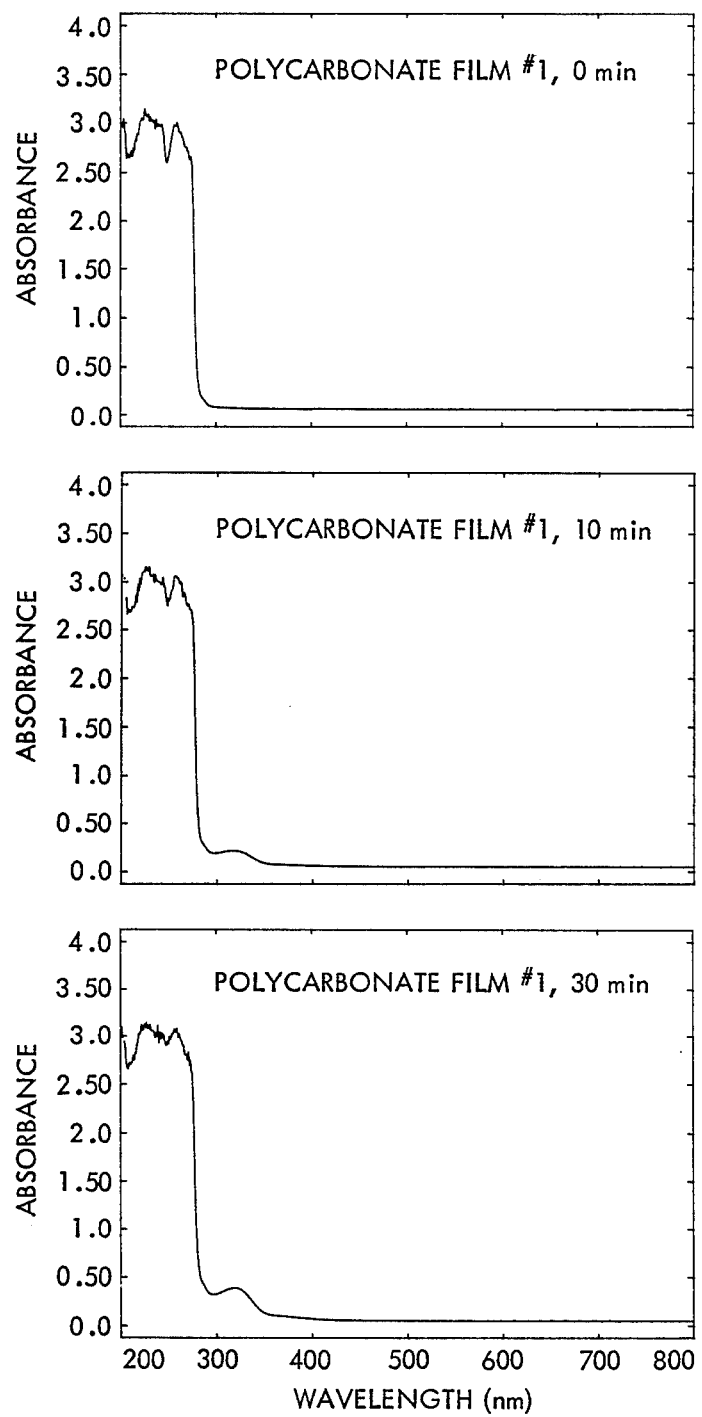
FIG. 2 is a series of curves showing the absorbance of polycarbonate films at 0, 10 and 30 minutes.

PC films were cast from $CH_2Cl_2$ solution of Lexan under $N_2$, dried in a vacuum oven at 40° C. for 168 hrs, then placed in the photochemical reactor which was continuously purged with $N_2$ gas. The reactor can be used to photoconvert either films or plates of sizes up to $10'' \times 10''$. The first stage photoconversion (to phenyl salicylate) was carried out using a low pressure Hg arc lamp ($\gamma = 253.7$ nm). The irradiation flux was 0.75 mw/cm$^2$. The film was taken out of the reactor from time to time and its electronic absorption spectrum was monitored in order to determine the extent and rate of phenyl salicylate formation. Typical data are shown in FIG. 2. During this conversion process, a certain fraction of PS formed photoconverted to form the State II product, 2,2'-dihydroxy benzophenone (FIG. 2). The relative efficiencies of these two processes can be estimated from the extinction coefficient data from Ref. 1. Thus, for the film irradiated for 60 min., only 14% of the PS groups have already been converted to the DBP derivative, causing a small absorption at 355 nm.

At the end of the radiation conversion at the first frequency, the film was left in the reactor but the low pressure lamp was replaced by a medium pressure Hg arc lamp.

Figure 3:
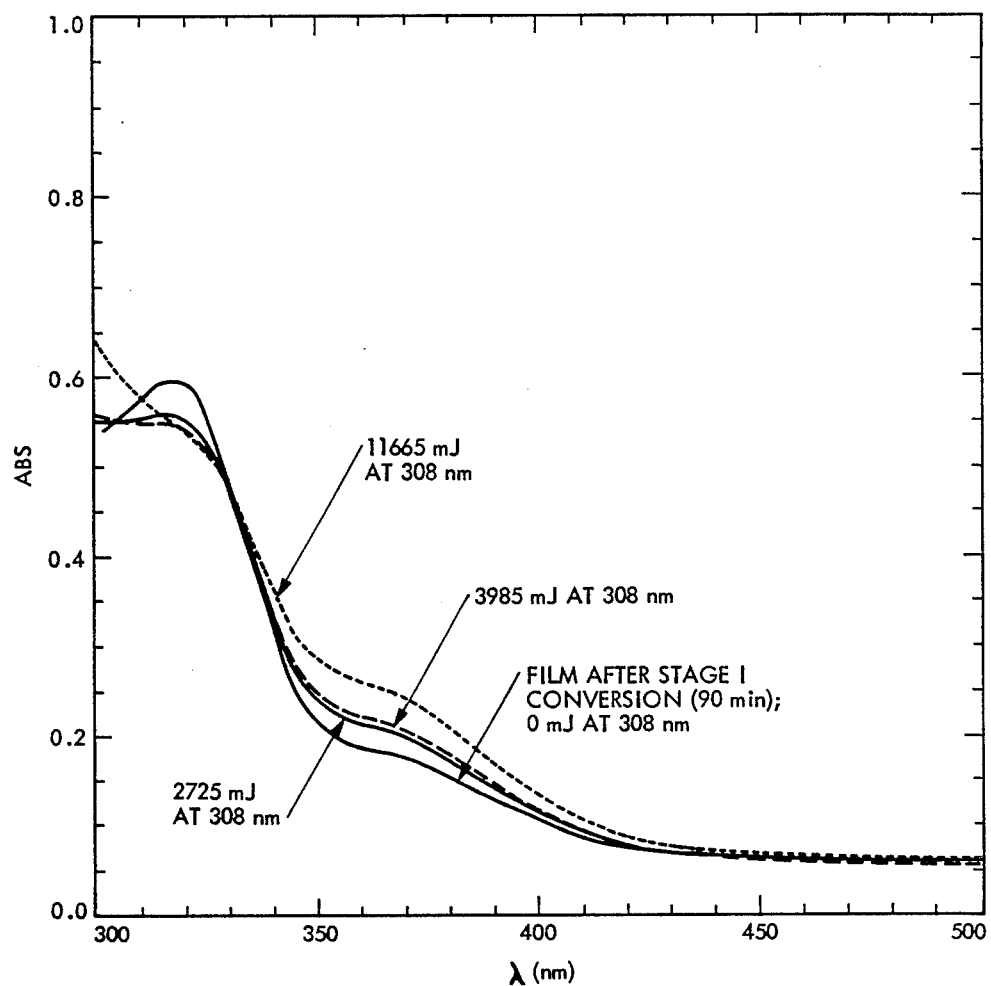
FIG. 3 is a series of curves showing the conversion of phenyl salicylate into dibenzophenone groups in polycarbonate films.

In another series of tests, ten laser pulses (0.85 millijoules each) from an Excimer Laser (=308 nm) were used for the second photoconversion leading to the formation of 2,2'-dihydroxybenzophenone. FIG. 3 shows typical electronic absorption changes in the film indicating formation of DBP groups. An overall conversion (carbonate to DBP) of 0.1 wt % corresponding to a DBP concentration of $(1 \times 10^{-2}$ moles/l approximately in the solid PC material is estimated to lead to optimum stabilization. When all the phenyl salicylate formed was photoconverted, the film was tested for photostability in an accelerated test chamber. The accelerated test chamber employed a filtered medium pressure Hg arc lamp for accelerating solar UV flux, and a constant temperature of 60° C. After 168 hrs, no significant change in electronic absorption characteristics of the film could be detected. Due to absorption and reflection, the conversion appears to be limited to a surface layer usually from 0.1 to 1.0 microns in thickness, typically about 0.5 microns.

It is to be realized that only preferred embodiments of the invention have been described and that numerous substitutions, modifications and alterations are permissible without departing from the spirit and scope of the invention as defined in the following claims.

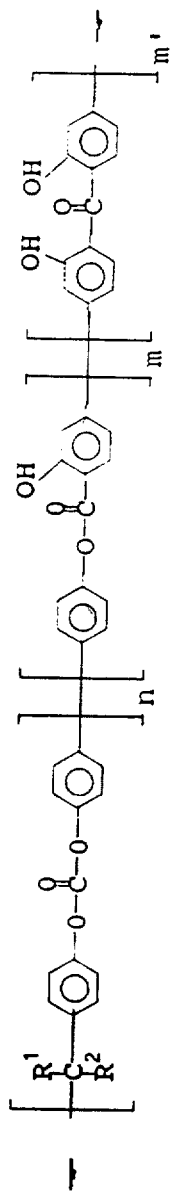

We claim:

1. A solid polycarbonate article having a bulk interior consisting essentially of a polycarbonate resin of the formula:

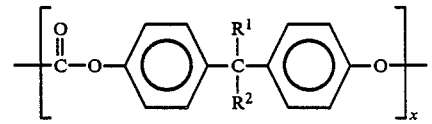

where x is the sum of $n + m + m'$ and said article having a surface layer of a stabilized polycarbonate resin of the formula:

where n, m, and m' are integers and $R^1$ and $R^2$ are individually selected from H, lower alkyl of 1 to 6 carbon atoms or aryl and $m + m'$ is 2 to 8 percent of $n + m + m'$ and m is at least 0.5 of $m + m'$.

2. An article according to claim 1 in which the ratio of $x/m + m'$ is from 12/1 to 50/1.

3. An article according to claim 2 in which both $R^1$ and $R^2$ are methyl.

* * * * *

UNITED STATES PATENT AND TRADEMARK OFFICE
CERTIFICATE OF CORRECTION

PATENT NO. : 4,945,001

Page 1 of 2

DATED : July 31, 1990

INVENTOR(S) : Amitava Gupta, Ranty H. Liang, Andre H. Yavroulan

It is certified that error appears in the above-identified patent and that said Letters Patent is hereby corrected as shown below:

Col 2, line 1, change "saicyate" to --salicylate--.

line 10, change "via" to --$\underline{via}$--.

line 13, change "$\gamma$" to --$\lambda$--.

line 14, change "$\gamma$" to --$\lambda$--.

line 16, change "via" to --$\underline{via}$--.

line 22, change "$\gamma$" to --$\lambda$--.

line 67, change "$\gamma$" to --$\lambda$--.

Col 6, line 5, change "$\gamma$" to --$\lambda$--.

line 59, after "formula:" insert--

Signed and Sealed this

Third Day of December, 1991

Attest:

HARRY F. MANBECK, JR.

Attesting Officer

Commissioner of Patents and Trademarks